United States Patent Office 2,996,783
Patented Aug. 22, 1961

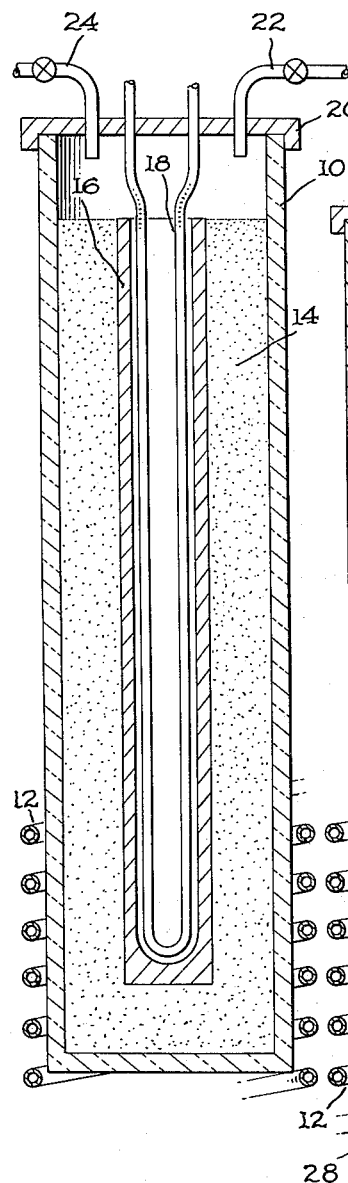
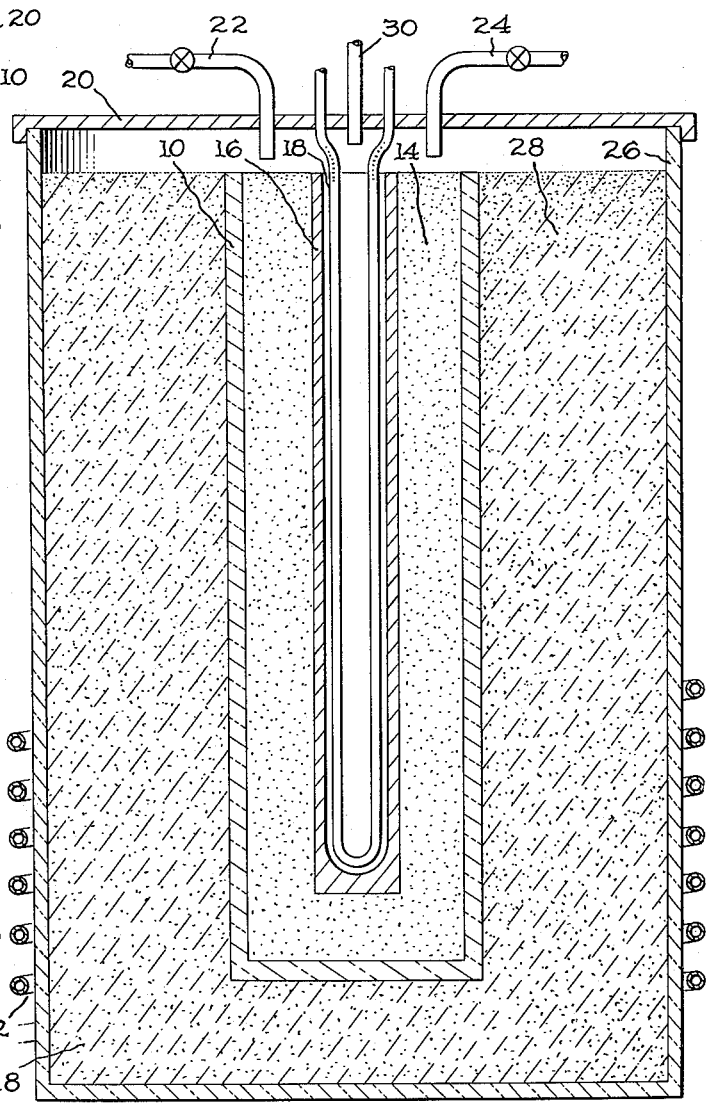

2,996,783
METHOD OF SHAPING SiC BY VAPORIZATION AND CONDENSATION
Edward F. Mayer, Cleveland, Ohio, assignor to Horizons Incorporated, Cleveland, Ohio, a corporation of New Jersey
Filed Nov. 24, 1958, Ser. No. 776,042
1 Claim. (Cl. 25—156)

This invention relates to the production of refractory articles of which at least one surface is composed of dense silicon carbide. More particularly, it relates to the production of such articles by the deposition of silicon carbide on a suitable base, to form a dense adherent coating thereon consisting of silicon carbide deposited from a vapor of silicon carbide and it may also include the removal of the base material, to produce an article consisting entirely of silicon carbide.

Silicon carbide is of interest because of its refractory nature and its semiconductive properties. To take full advantage of its refractory nature, it is necessary that the silicon carbide exist as a dense continuous coating on the surface exposed to highly erosive conditions at elevated temperatures.

Silicon carbide is most commonly known in the small granular form obtained by reacting silica and coke at elevated temperatures. The crystals of this product are difficult to consolidate into solid articles of silicon carbide because the silicon carbide does not melt at atmospheric pressure, but instead passes directly from the solid state to the vapor state. Deposition of the vapor on a suitable substrate to form silicon carbide coatings is rendered difficult because of the tendency of silicon carbide vapor to dissociate. Three general procedures have been devised for obtaining polycrystalline dense silicon carbide for refractory or semiconductor end applications. One method involves the use of a bonding agent. This is objectionable because the addition of an extraneous constituent to the silicon carbide yields a product with inferior properties as compared with pure silicon carbide. A second procedure requires the use of very high pressure and temperature to effect consolidation. Since silicon carbide sinters well above 2000° C., even under high pressure, in the absence of any binder, provision of suitable equipment is a major deterrent to the practice of this class of processes. A third process involves the production of silicon carbide by reaction between a vapor of silica or silicon and a carbonaceous base, e.g. as described in 2,677,267. The method has been found useful only in the production of extremely thin coatings, since penetration of the vapor is limited in depth once a coating forms.

By the present invention an entirely different procedure has been devised for obtaining a dense solid mass of silicon carbide at atmospheric pressure and without the use of extraneous binder materials. In the present process silicon carbide grains are heated in a furnace wherein the thermal conditions are carefully controlled to cause vaporization of some of the silicon carbide and recondensation of the vapor in selected regions in which some solid silicon carbide is initially present. As a result a dense solid mass of silicon carbide is produced, composed of the silicon carbide initially present and silicon carbide deposited from the vapor state between the grains of silicon carbide initially present and which have not been vaporized.

In brief, a core or shape of carbon whose configuration corresponds to or is the reverse of the contour desired to be produced of silicon carbide is packed in granular silicon carbide and is confined to a furnace to which heat may be applied in a controlled manner, and then heated therein to temperatures at least sufficient to vaporize a portion of the silicon carbide. The vapor condenses on cooler portions of the apparatus, and particularly on the core or shape, between grains of silicon carbide already present.

For the purposes of illustration, two simple embodiments are shown schematically in the drawings which are views in section of apparatus for practicing the invention, similar parts being designated by the same numerals in both figures.

In FIGURE 1: 10 is an outer graphite container which also serves as an induction susceptor, 12 is an induction coil positioned about the container 10, 14 is a charge of granular silicon carbide, 16 is a carbon or graphite core about which the desired SiC shape is to be formed, 18 represents a heat removal means and 20 represents a cover provided with inlet means 22 for admitting an inert gas and outlet means 24 for removing gases from the apparatus before the vaporization is begun.

Means known in the art are provided for maintaining the desired thermal conditions in the apparatus. In operation, after core 16 has been shaped to the desired configuration, it is positioned in the furnace cavity and the furnace is charged with granular silicon carbide disposed about the core 16 so as to completely cover the region of the core which is to be provided with a dense surface of silicon carbide. The silicon carbide charge is preferably in the form of small particles. The particles should not be so fine that vapor cannot pass from the hotter surface to the colder zone, nor should they be so coarse that large amounts of deposited silicon carbide are required to be condensed to bridge the gaps between particles. I have found that a workable grain size includes particles between minus 20 mesh (Tyler Standard) and plus 100 mesh (Tyler Standard), particles about minus 40 mesh (Tyler Standard) being preferable, and that the charge should include material of various sizes in the stated range.

After the apparatus has been charged, it is flushed with an inert gas, preferably a noble gas such as argon. Thereafter, the induction coil is powered and the outer susceptor, the side wall portion of the graphite container, is allowed to stabilize at a temperature in the range of 2600 to 2700° C. Inasmuch as silicon carbide decomposes and vaporizes above 2500° C., the material close to the wall of the susceptor is vaporized and tends to diffuse towards the cooler surfaces in the apparatus, and particularly towards the surface of the graphite core which is maintained at between 2400° C. and 2450° C. A relatively high temperature gradient exists through the silicon carbide mass, but because of the higher thermal conductivity of the susceptor and the carbon core, the temperature gradient in these parts is relatively small. The output of the susceptor and the removal of heat from the interior of the hollow core, are controlled so that the desired thermal conditions are maintained. As the silicon carbide is vaporized from the region adjacent the susceptor, it diffuses toward the core and condenses upon particles of silicon carbide adjacent to the carbon core, and on the carbon core itself. This causes a densification and growth of the SiC layer surrounding the carbon core. As this layer forms, it assumes the temperature of the core 16, and the point of growth proceeds to move outward from the central core as the silicon carbide continues to be deposited.

Using the apparatus described above, with graphite furnace parts and minus 40 mesh (Tyler Standard) silicon carbide, dense layers of silicon carbide up to ½" to ⅝" in thickness have been readily and reproducibly obtained, apparently limited primarily by the size and configuration of the furnace rather than by the process itself. These layers have been found to possess a density close to the theoretical density calculated for SiC. Under the microscope, the material is translucent to light, even in relatively thick sections. Its electrical resistivity has been found to be between $10^3$ and $10^5$ ohm-centimeters which is also indicative of a high state of purity.

Microscopic examination shows the deposited layer to be polycrystalline in nature with crystals up to $1/8''$ on a side and grown completely together. Void content in the layer appears to amount to less than one-half percent and these voids are found to be discontinuous and usually in the form of pin holes or very small spherical cavities.

After the furnace and its contents have been permitted to cool no change in the shape or size of the core is observed. In fact, the surface of the silicon carbide formed on the core 16 is a faithful reproduction of the original surface of the core 16.

The SiC may be readily detached from the core in many instances, e.g. by striking the core a sharp blow but it is also possible to remove the core mechanically, e.g. by machining or to remove it chemically, e.g. by oxidation or burning it, leaving the SiC as a body possessing the desired configuration.

It is preferred that at least 45 percent of the ultimate layer be formed of silicon carbide particles which did not vaporize, the remainder of the layer being the SiC deposited from a vapor. These relative proportions may of course be increased or decreased depending on the configuration, dimensions and duration of the process, without departing from the intended scope of my invention.

The following example is illustrative of one manner of practicing my invention to produce a cylinder of silicon carbide one inch inside diameter and two inches to three inches long with approximately ¼ inch wall thickness by the apparatus shown in FIGURE 2.

A carbon cylinder 16 about one inch in diameter and between eight inches and ten inches long was prepared with a ¾ inch hole extending to within ¼ inch of one end of the piece. This was inserted, closed end down, in a carbon susceptor 10, three inches O.D. with a ¼ inch wall thickness and commercial 60 mesh silicon carbide grains packed around it. The susceptor and its contents were then inserted in an eight inch diameter silica tube 26 and carbon black insulation 28 packed around it. This was then placed in an induction coil and centered so the bottom 2½ inches of member 16 were positioned centrally in the coil at the point of maximum flux. A tube 30 was provided for sighting an optical pyrometer into the hollow central portion of the tube 16 for temperature determinations. About one-half liter per minute of purified and dried argon was passed into the silica tube during the firing operation. By application of about seventeen kw. to the induction coil the cylinder 10 was heated to a temperature of 2530–2550° C., as measured on the bottom of the hollow cylinder by an optical pyrometer. This temperature was maintained for five hours by varying the input power. The apparatus was then allowed to cool to room temperature. Upon disassembly it was found that the desired layer of silicon carbide had formed on the exterior of the carbon tube to a thickness of $3/16$ inch and over a length of about three inches along the tube 16, tapering at the upper end to a thickness of ⅛ inch. When examined, the layer was found to consist of dense substantially pure silicon carbide free from voids and contamination and admirably adapted to exposure to severely corrosive atmospheres at elevated temperatures.

The silicon carbide product of the above described process is alpha SiC, of high purity. Tests of the product have indicated that it is impervious at moderate gas pressures (e.g. 25 p.s.i. gauge $N_2$) and microscopic examination of sections polished with a diamond wheel revealed only discontinuous pores or voids.

Virtually no change was exhibited by a specimen tested for 40 hours in air at temperatures approaching the vaporization temperature of SiC and no appreciable weight loss or gain was experienced in the test.

In summary then, the SiC produced in accordance with the present invention possesses the following excellent combination of properties:

(1) Theoretical density.
(2) Low impurity content.
(3) Impermeability to gases at ambient and elevated temperatures.
(4) Thermal conductivity intermediate that of metals and ceramics.
(5) Resistance to oxidation at temperatures above 2000° F.
(6) Ability to be formed to close tolerances.
(7) High strength at elevated temperatures.

Having now described my invention in accordance with the patent statutes, I claim:

A method of producing an article at least one surface of which consists of dense silicon carbide and has a contour which is an exact reproduction of the contour of a surface whose contour is to be reproduced, which comprises:

embedding a carbonaceous body in a mass of particles of silicon carbide wherein the mesh size lies between 20 mesh and 100 mesh particle size, one surface of said carbonaceous body being the surface whose configuration is to be reproduced;

heating at least one region of said mass of particles to a temperature sufficient to vaporize at least some of the silicon carbide particles in said heated region, and simultaneously therewith cooling the embedded carbonaceous body to maintain the surface whose contour is to be reproduced at a temperature between 2400° C. and 2450° C. and which is below the temperature at which vaporization of any appreciable amount of silicon carbide particles adjacent said surface can occur;

condensing the silicon carbide vapor resulting from the heating of said region, between the particles adjacent to said cooled surface; and continuing the simultaneous heating, cooling and condensing for at least a time sufficient to substantially completely fill the voids between the non-vaporized particles originally adjacent said cooled surface, thereby producing a dense coherent continuous body of silicon carbide on the cooled surface of said embedded carbonaceous body and having a conformation corresponding to the surface of said cooled body.

References Cited in the file of this patent

UNITED STATES PATENTS

| | | |
|---|---|---|
| 650,235 | Fitzgerald | May 22, 1900 |
| 1,804,361 | Marcin | May 5, 1931 |
| 1,982,012 | Mingard | Nov. 27, 1934 |
| 2,188,693 | Thompson | Jan. 30, 1940 |
| 2,854,364 | Lely | Sept. 30, 1958 |
| 2,922,213 | Bollack et al. | Jan. 26, 1960 |